(12) United States Patent
Oba

(10) Patent No.: US 12,449,378 B2
(45) Date of Patent: Oct. 21, 2025

(54) EDGE PORTION MEASURING APPARATUS AND METHOD FOR MEASURING EDGE PORTION

(71) Applicant: SHIN-ETSU HANDOTAI CO., LTD., Tokyo (JP)

(72) Inventor: Shigeru Oba, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 136 days.

(21) Appl. No.: 18/153,036

(22) Filed: Jan. 11, 2023

(65) Prior Publication Data
US 2023/0258577 A1 Aug. 17, 2023

(30) Foreign Application Priority Data

Jan. 27, 2022 (JP) .................................. 2022-11283

(51) Int. Cl.
*G01N 21/95* (2006.01)
*G01N 21/47* (2006.01)
*H01L 21/66* (2006.01)

(52) U.S. Cl.
CPC ..... *G01N 21/9503* (2013.01); *G01N 21/4738* (2013.01); *H01L 22/12* (2013.01); *G01N 2021/4783* (2013.01); *G01N 2201/101* (2013.01); *G01N 2201/103* (2013.01)

(58) Field of Classification Search
CPC ........... G01N 21/9503; G01N 21/4738; G01N 2021/4783; G01N 2201/101; G01N 2201/103; H01L 22/12
See application file for complete search history.

(56) References Cited

U.S. PATENT DOCUMENTS

| 2007/0195314 A1 | 8/2007 | Morimoto et al. |
| 2010/0134615 A1 | 6/2010 | Akamatsu et al. |

(Continued)

FOREIGN PATENT DOCUMENTS

| JP | 2007-147288 A | 6/2007 |
| JP | 2007-256257 A | 10/2007 |

(Continued)

OTHER PUBLICATIONS

Jul. 12, 2022 Office Action issued in Japanese Patent Application No. 2022-011283.

*Primary Examiner* — Jamil Ahmed
(74) *Attorney, Agent, or Firm* — Oliff PLC

(57) ABSTRACT

An edge portion measuring apparatus for measuring shape of an edge portion of a wafer, including, a holding portion that holds the wafer, a rotating means for rotating the wafer, a sensor including a light projecting portion for projecting a laser light from a light source onto the edge portion of the wafer held by the holding portion, and a light receiving detection unit receiving diffuse reflected light that the laser light projected is reflected at the edge portion of the wafer, wherein, rotating the wafer while holding the wafer, at least in a range from normal direction of a held surface of the wafer to normal direction of a surface opposite to the held surface, projecting the laser light and detecting the diffuse reflected light by the sensor, being able to measure the shape of an entire area of the edge portion of the wafer by a triangulation method.

16 Claims, 6 Drawing Sheets

(56) References Cited

U.S. PATENT DOCUMENTS

| | | | |
|---|---|---|---|
| 2011/0123092 A1* | 5/2011 | Sakamoto | G01B 11/24 |
| | | | 702/167 |
| 2013/0215258 A1* | 8/2013 | Gaglin | H04N 7/18 |
| | | | 348/87 |
| 2020/0041251 A1 | 2/2020 | Gondaira et al. | |

FOREIGN PATENT DOCUMENTS

| | | |
|---|---|---|
| JP | 2009-025079 A | 2/2009 |
| JP | 2011-112384 A | 6/2011 |
| JP | 2013-171042 A | 9/2013 |
| JP | 2020-020717 A | 2/2020 |

* cited by examiner

[FIG. 1]
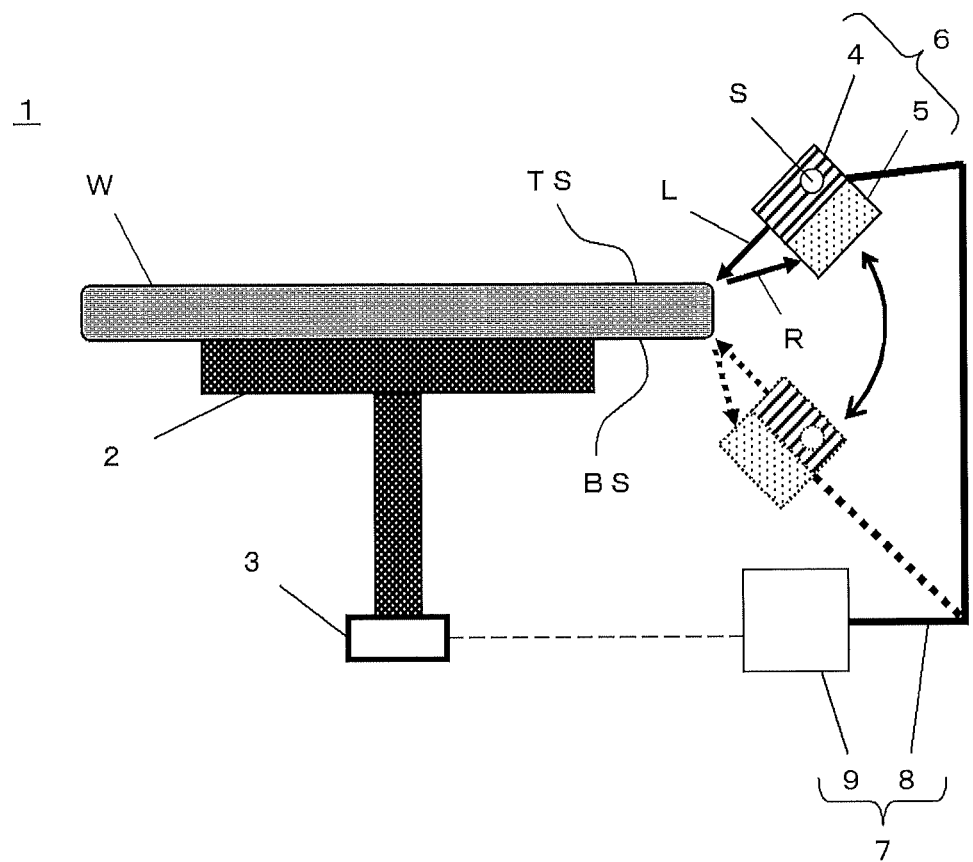
[FIG. 2]
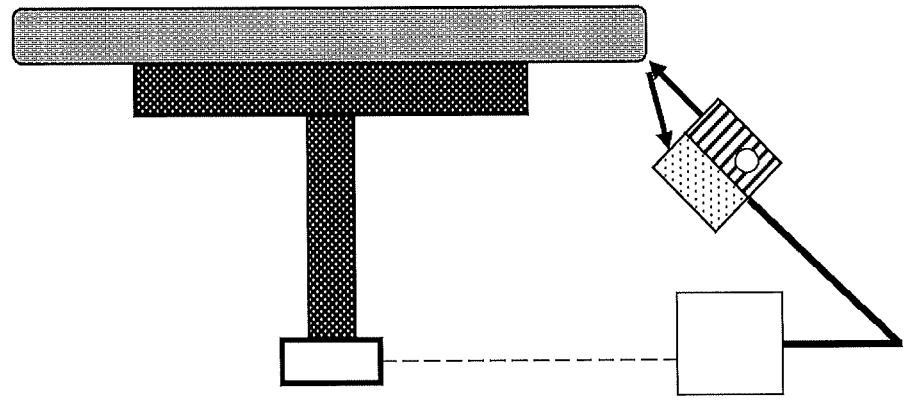

[FIG. 3]
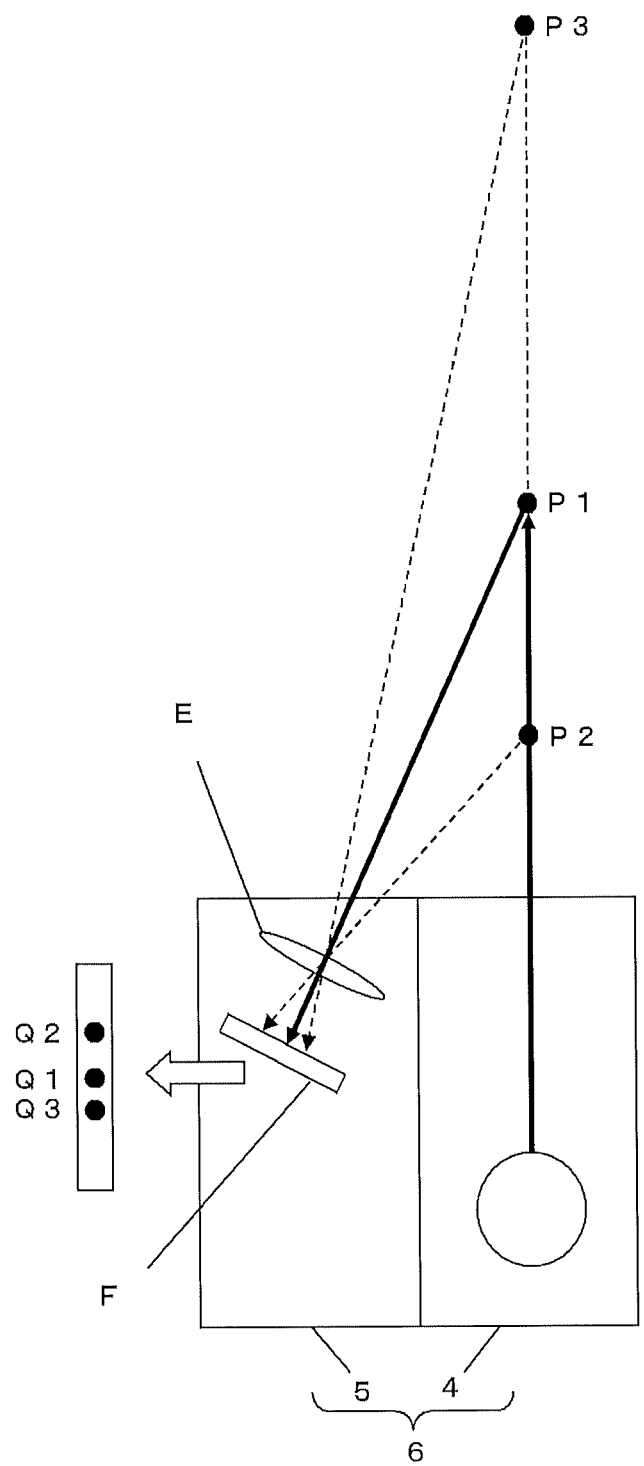

[FIG. 4]
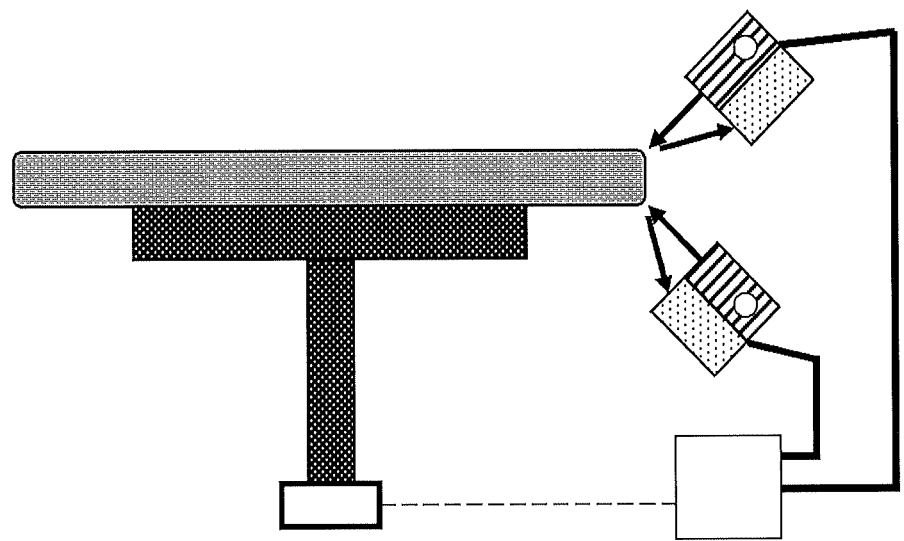
[FIG. 5]
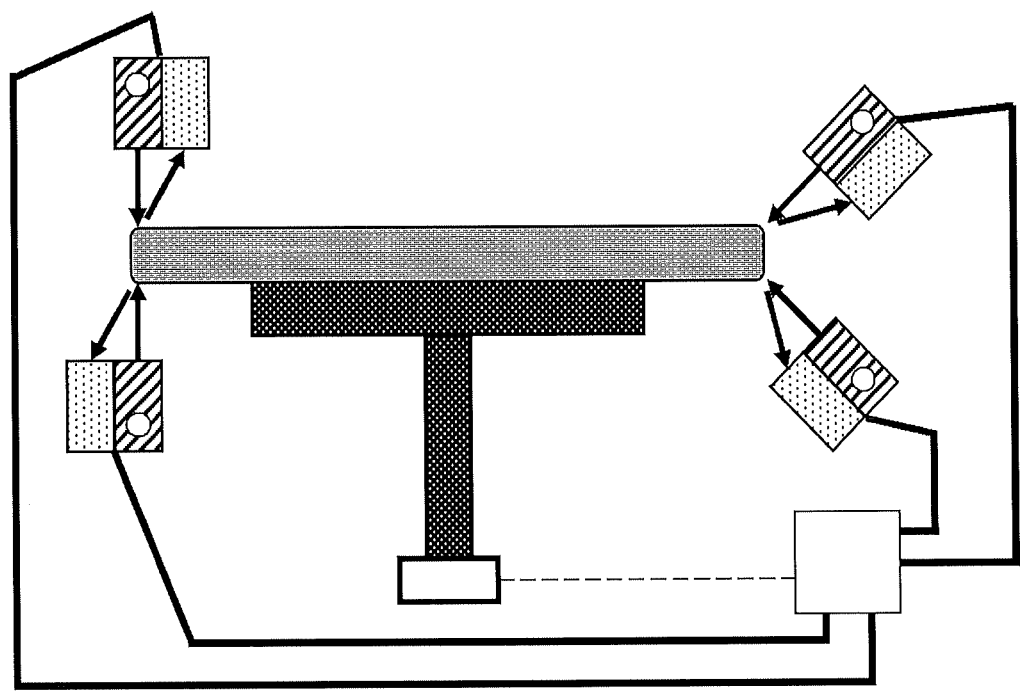

[FIG. 6]
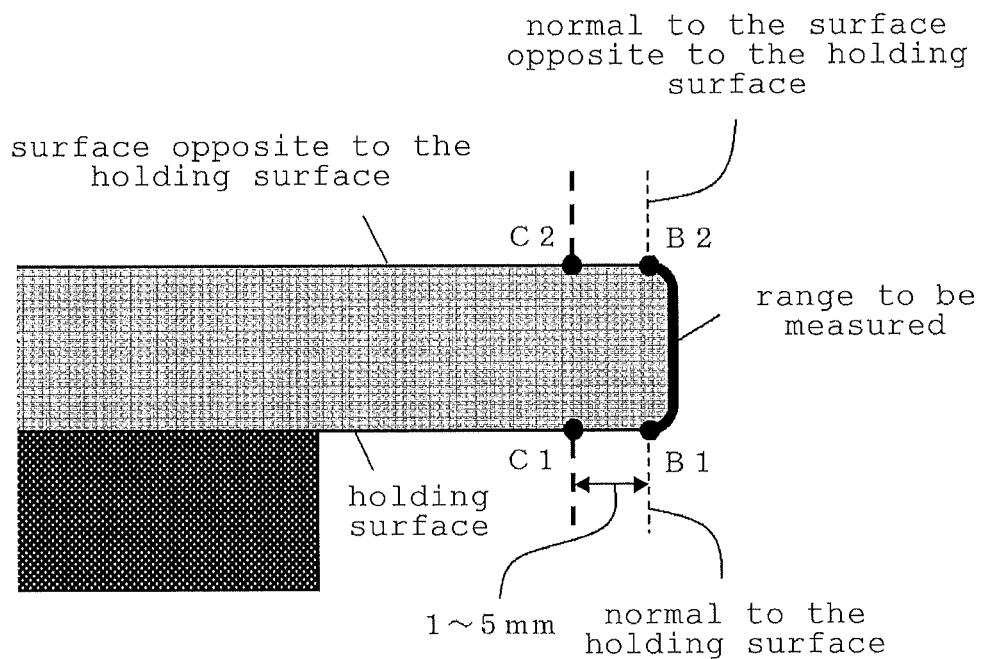

[FIG. 7]
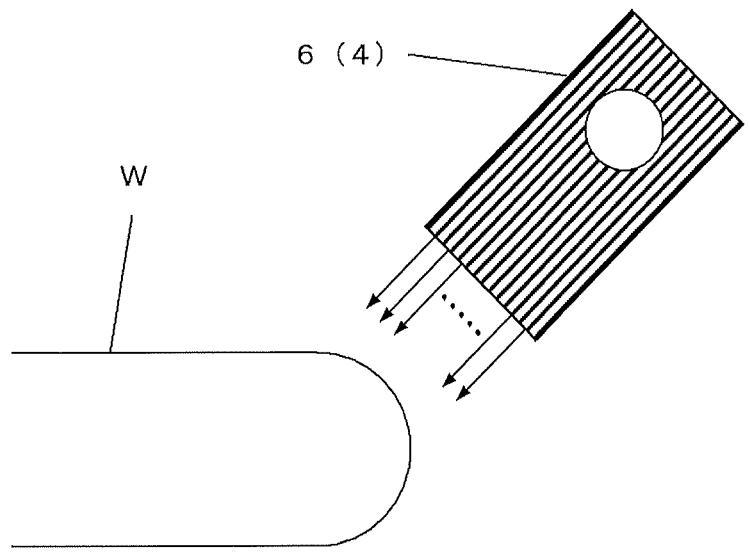
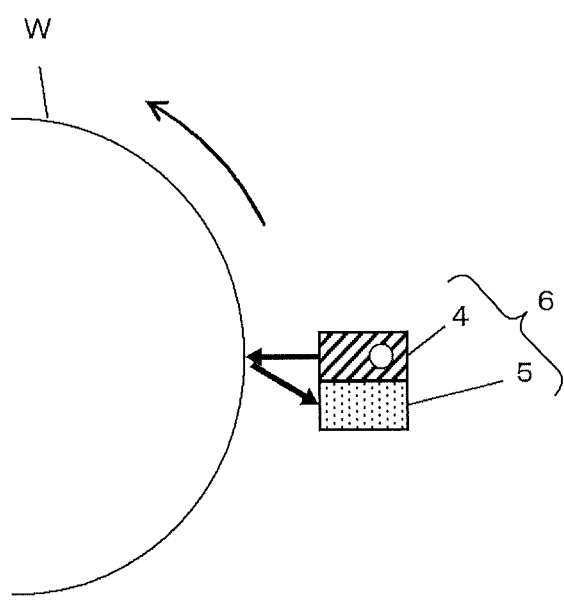

[FIG. 8]
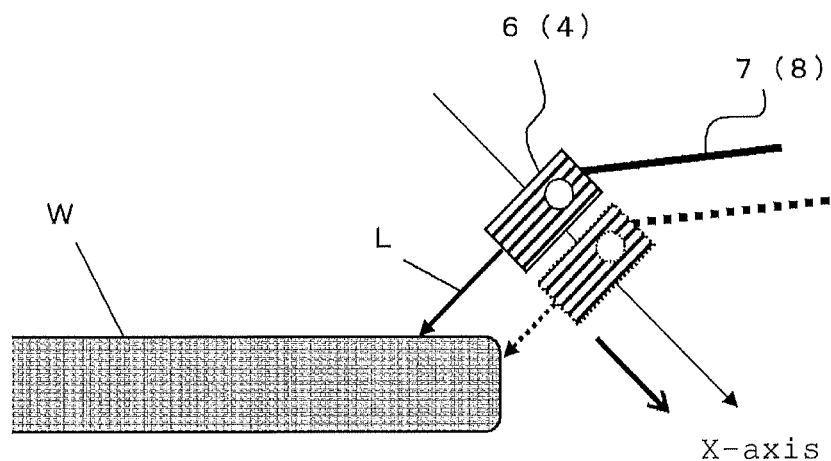

EDGE PORTION MEASURING APPARATUS AND METHOD FOR MEASURING EDGE PORTION

TECHNICAL FIELD

The present invention relates to an edge portion measuring apparatus and a method for measuring edge portion for measuring shape of an edge portion of a wafer.

BACKGROUND ART

In a process of processing semiconductor wafers, chamfering is performed on the edge portion of the wafer to prevent cracking and chipping. Further, polishing is performed in order to prevent dust from being generated from the edge portion and to facilitate inspection of scratches, defects, and adherence on the edge portion. Furthermore, as the miniaturization of semiconductor devices progresses, there is an increasing demand for improved precision in edge portion shape and reduced defects.

For example, Patent Document 1 describes a measuring method in which, in evaluation of the shape of the edge portion, means for irradiating and receiving light are arranged and calculation is performed to calculate the shape of the edge portion based on the reflected light.

Patent Document 2 describes a method for calculating the shape of the edge portion by irradiating light from LEDs arranged to surround the edge portion at different angles in sequence and detecting the luminance peak of the reflected light.

Patent Document 3 describes a method of evaluating the shape of the edge portion by projecting light from the side surface of the edge portion and photographing a projected image (silhouette).

Patent Document 4, describes a method for evaluating edge portion in which illumination light is condensed so that the focal plane crosses the edge of the wafer, the reflected light is detected via a confocal optical system, and the position where the reflected light intensity peaks is detected as the edge portion.

CITATION LIST

Patent Literature

Patent Document 1: JP 2007-147288 A
Patent Document 2: JP 2007-256257 A
Patent Document 3: JP 2009-025079 A
Patent Document 4: JP 2020-020717 A

SUMMARY OF INVENTION

Technical Problem

However, when the inventor of the present invention conducted a survey on the evaluation methods such as Patent Document 1 and Patent Document 2, which evaluate by irradiating light and utilizing specular reflection, specular reflected light could not be received unless the surface was polished or etched to the extent that the edge portion reflects specular light.

In addition, although the method of evaluating a projected image in which light is projected in Patent Document 3 can measure the shape of the edge portion, it cannot capture all fine adherence, chips, and streaks.

Furthermore, the method of Patent Document 4 requires a large-scale and complicated optical system mechanism and a detection mechanism, and furthermore, a great deal of time is required to scan and evaluate all the edge portion.

The above problems will be explained in detail.

In order to measure the shape of the wafer edge portion and to detect defects such as, foreign matter adhesion, chipping, and streaks, it could not be measured unless it was mirror etched or polished using polishing cloth and slurry until the surface roughness of the wafer edge portion was such that the laser light was specular reflected. Therefore, in wafer manufacturing process, it was not possible to measure the shape and quality of the edge portion of the wafer in slicing process, chamfering process, and etching process using an alkaline aqueous solution over the entire circumference of the wafer and it was limited to a shape of cross section in a part or a partial area. As a result, chipping, cracks, streaks, and the like were present on the edge portion of the wafer, and the presence of these caused damage to the wafer inside of an apparatus, resulting in the trouble of stopping the apparatus.

Moreover, even if measurement was possible, the optical system for receiving and measuring the specular reflection of the laser light was complicated, and the measurement equipment was a large-scale mechanism. It took a lot of time to measure the entire circumference of the wafer due to narrow measurement range.

The present invention has been made in view of the above problems. It is an object of the present invention to provide an edge portion measuring apparatus and a method for measuring edge portion that can measure the shape of the entire edge portion of a wafer in a short period of time without being influenced by the surface condition of the edge portion of the wafer.

Solution to Problem

In order to achieve the above object, the present invention provides an edge portion measuring apparatus for measuring shape of an edge portion of a wafer, comprising,
  a holding portion that holds the wafer,
  a rotating means for rotating the wafer by rotating the holding portion,
  a sensor which comprises a light projecting portion for projecting a laser light from a light source onto the edge portion of the wafer held by the holding portion, and a light receiving detection unit that receives diffuse reflected light that the laser light projected from the light projecting portion is reflected at the edge portion of the wafer, wherein,
  rotating the wafer by the rotating means while holding the wafer by the holding portion,
  at least in a range from normal direction of a held surface of the wafer to normal direction of a surface opposite to the held surface, projecting the laser light and detecting the diffuse reflected light by the sensor,
  being able to measure the shape of an entire area of the edge portion of the wafer by a triangulation method.

With such an edge portion measuring apparatus of the present invention, when measuring the shape of the wafer edge portion by scanning the edge portion of the wafer with a laser light, the measurement is performed by receiving diffuse reflected light instead of specular reflected light. Therefore, the measurement can be performed regardless of the surface condition of the edge portion of the wafer. It becomes possible to measure the shape of the edge portion of the wafer in any of the processing processes (for example, slicing process, chamfering process, lapping/grinding process, and etching process).

In addition, by using diffuse reflected light, it becomes possible to measure a wide range at once, and the entire edge portion can be measured in a short time. Moreover, it can be measured with a simple optical system.

In addition, by calculating the variation from the average (ideal) edge portion shape in each processing process from the measured shape, it is possible to detect foreign matter adhesion (convex portions), chipping, streaks (grinding striations) (concave portions) (hereafter referred to as foreign matter adhesion etc.).

Furthermore, it is possible to measure machining removal (grinding removal, lapping removal, etching removal, etc.) in the processing process from the measured shape before and after the processing process. It is possible to judge in real time determination of the life of tools and chemicals (grinding wheels, lapping carriers, etchants, etc.) used in the processing process.

The reason why these detections are possible, as mentioned above, is that it is possible to easily and quickly measure the shape of the edge portion of wafers in various processing processes.

In this case, a plurality of the sensors may be provided.

With such an apparatus, the entire area of the edge portion of the wafer can be divided into a plurality of measurement areas according to the number of sensors and can be measured at the same time, so that the measurement can be performed in a shorter time.

Also, the sensor is of fixed placement, or
a sensor angle adjustment mechanism for adjusting position and angle of the sensor along the edge portion of the wafer can be further provided, and the sensor angle adjustment mechanism can adjust the position and angle of the sensor.

It is particularly convenient if the sensor is of fixed placement. Moreover, if the position and angle of the sensor can be adjusted by the sensor angle adjustment mechanism, it is easy to complete the measurement particularly with one sensor.

Also, a control unit that determines foreign matter adherence, chipping, chips, or streaks from a difference between measured shape of the wafer edge portion and ideal shape of the wafer edge portion calculated from the measured shape can be further provided.

With such an apparatus, it is possible to easily determine the above-mentioned foreign matter adherence etc.

The present invention also provides a method for measuring an edge portion for measuring shape of the edge portion of a wafer, comprising,
by using,
a holding portion that holds the wafer,
a rotating means for rotating the wafer by rotating the holding portion,
a sensor which comprises a light projecting portion for projecting a laser light from a light source onto the edge portion of the wafer held by the holding portion, and a light receiving detection unit that receives diffuse reflected light that the laser light projected from the light projecting portion is reflected at the edge portion of the wafer,
wherein,
rotating the wafer by the rotating means while holding the wafer by the holding portion,
at least in a range from normal direction of a held surface of the wafer to normal direction of a surface opposite to the held surface, projecting the laser light and detecting the diffuse reflected light by the sensor,
the shape of an entire area of the edge portion of the wafer by a triangulation method.

According to the method for measuring an edge portion of the present invention, the edge portion of the wafer in various processing processes can be measured by receiving the diffuse reflected light and measuring the edge portion without being influenced by the surface state of the edge portion of the wafer.

Further, the entire edge portion can be measured in a short time with a simple optical system.

In addition, from the measured shapes in various processing processes, it is possible to detect the adhesion of foreign matter, measure the machining removal in the processing process, and determine the life of tools and chemicals used in the processing process.

At this time, a plurality of the sensors can be used.

In this way, the entire area of the edge portion of the wafer can be measured at the same time by allocating the sensors according to the number of the sensors, so that the measurement can be performed in a shorter time.

Also, using a fixed arrangement as the sensor, or
further using a sensor angle adjustment mechanism that adjusts position and angle of the sensor along the edge portion of the wafer, and using the sensor angle adjustment mechanism that can adjust the position and angle of the sensor, the laser light is projected and the diffuse reflected light is received.

It is particularly convenient to use the sensor with fixed placement. Also, if a sensor whose position and angle can be adjusted by a sensor angle adjustment mechanism is used, it is possible to easily perform measurement particularly with one sensor.

Also, determination is performed by using further a control unit that determines foreign matter adherence, chipping, chips, or streaks from a difference between measured shape of the wafer edge portion and ideal shape of the wafer edge portion calculated from the measured shape.

By doing so, it is possible to easily determine the above-mentioned foreign matter adherence etc.

Advantageous Effects of Invention

With the edge portion measuring apparatus and the edge portion measuring method of the present invention, the shape of the edge portion of the wafer in each processing process can be measured simply and in a short period of time. Furthermore, it can be used to detect adhesion of foreign matter etc., measure the machining removal in each processing processes, and determine the life of tools and chemicals.

BRIEF DESCRIPTION OF DRAWINGS

FIG. 1 is an explanatory diagram showing an example of an edge portion measuring apparatus (having one sensor whose position and angle are adjustable) according to a first embodiment of the present invention.

FIG. 2 is an explanatory diagram showing an example of measurement (lower half of the edge portion) by the edge portion measurement method of the present invention.

FIG. 3 is a schematic explanatory diagram of the triangulation method.

FIG. 4 is an explanatory view showing an example of an edge portion measuring apparatus (two sensors fixedly arranged) according to a second embodiment of the present invention.

FIG. 5 is an explanatory view showing an example of an edge portion measuring apparatus (including for notch portion inner surface measurement) according to a third embodiment of the present invention.

FIG. 6 is an explanatory diagram showing a range to be measured on the edge portion.

FIG. 7 is an explanatory diagram showing an example of a sensor.

FIG. 8 is an explanatory diagram showing an example of an edge portion measuring apparatus according to a fourth embodiment of the present invention.

DESCRIPTION OF EMBODIMENTS

Hereinafter, the present invention will be described in detail as an example of embodiments with reference to the drawings, but the present invention is not limited thereto.

As described above, there has been a demand for an edge portion measuring apparatus and an edge portion measuring method capable of measuring the shape of the entire edge portion of a wafer in a short period of time without being affected by the surface condition of the edge portion of the wafer.

The inventor of the present invention has made an intensive research and found that by an apparatus and method for measuring the shape of the entire area of the edge portion of the wafer by triangulation method by projecting laser light and receiving diffuse reflected light, while rotating the held wafer, at least the range from the normal direction of the wafer holding surface to the normal direction of the surface opposite to the holding surface (i.e., it means that a range to be measured includes at least the edge portion area (thick line) as shown in FIG. 6) by using a sensor (a light projecting portion for projecting a laser light and a light receiving detection unit that receives diffuse reflected light at the edge portion of the wafer), the shape of the edge portion of a wafer can be measured easily in a short time in various processing processes, and has completed the present invention.

First Embodiment: An Embodiment in which the Position and Angle of the Sensor are Adjustable A first embodiment of the present invention will be described.

FIG. 1 shows an apparatus for measuring edge portion of a wafer according to the first embodiment of the present invention, in which a laser light is projected onto the edge portion of a wafer, diffuse reflected light is received and detected, and a wide range is measured collectively by triangulation method.

As shown in FIG. 1, the edge portion measuring apparatus 1 of the first embodiment includes a holding portion 2 for placing and holding a wafer W, a rotating means 3 for rotating the holding portion 2, a sensor 6 including a light projecting portion 4 including a light source S of a laser light L and a light receiving detection unit 5 for receiving and detecting diffuse reflected light R of the laser light L reflected at the edge portion of the wafer W, and a sensor angle adjustment mechanism 7 for adjusting the position and angle of the sensor 6 along the edge portion of the wafer W.

The holding portion 2 is not particularly limited as long as the wafer W can be placed thereon and can be fixed and held even during rotation. Further, the rotating means 3 may also be any means capable of rotating the holding portion 2 at a desired rotational speed (rotation rate). The wafer W is rotated together with the holding portion 2 by rotating the holding portion 2 by the rotating means 3. The rotation rate to be set can be, for example, 0.1 to 4.0 rpm. The rotation rate is not particularly limited, but in the case of high rotation, the measurement time is shortened. In order to prevent the sensitivity for detecting light reception from decreasing due to the number of pixels and the pixel size of the CMOS sensor used in the light receiving detection unit 5, for example, it is preferable to set the rotation rate to such an extent that these sensitivities do not decrease.

In the sensor 6, the light projecting portion 4 including the light source S may emit a laser light L, for example, a blue laser light with a wavelength of 405 nm. Further, the light receiving detection unit 5 only needs to be able to receive and detect the diffuse reflected light R.

As the sensor 6, for example, it can be a line sensor with 1600 pixels and a size of 5 μm/pixel, as shown in FIG. 7 (the upper figure is a side view, and the lower figure is a plan view). The device can scan up to 1600 pixels at most at once. Here, a large number of laser lights are projected at intervals of 5 μm, but the intervals and the number of beams are not particularly limited.

When such a line sensor is used, the laser light is projected linearly in a direction perpendicular to the rotation direction of the wafer W, as shown in the upper figure of FIG. 7. Also, regarding the positional relationship between the light projecting portion 4 and the light receiving detection unit 5, in FIG. 1, for the sake of simplicity, they are arranged in the direction perpendicular to the rotation direction of the wafer, in case of a line sensor, they are arranged side by side in plan view, as shown in lower figure of FIG. 7 (along the direction of rotation of the wafer W).

The sensor angle adjustment mechanism 7 has an arm 8 to which the sensor 6 is attached and a control unit (computer) 9. The movement of the arm 8 can be controlled by the control unit 9 (in particular, automatic control is possible by a program or the like) and it is possible to manipulate the arm 8 freely by control of the control unit 9 and adjust the position and angle of the sensor 6 attached to the tip along the edge portion of the wafer W held by the holding portion 2. As a result, the laser light L can be projected from the light projecting portion 4 of the sensor 6 to a desired location. More specifically, the laser light L can be projected onto the measurement point on the edge portion of the wafer W held by the holding portion 2. At least in a range (range to be measured) from the normal direction of the holding surface (lower surface BS) of the wafer W to the normal direction of the surface (upper surface TS) opposite to the holding surface via the edge portion side, the laser light L can be projected by moving the sensor 6 toward the object.

In other words, the above range is from a boundary B1 between the holding surface (lower surface BS) of the wafer W and the edge portion to a boundary B2 between the surface opposite to the holding surface (upper surface TS) and the edge portion as shown in FIG. 6.

However, the range to be measured is not limited to the above range, and can be further expanded to the inner side of the surface of the wafer W, as necessary. That is, when the positions inside the boundaries B1 and B2 toward the in-plane center of the wafer W are defined as C1 and C2, the range from C1 to C2 via the edge portion sides (B1 and B2) can also be the range to be measured. The distance between B1 and C1 and between B2 and C2 can be set to 1 to 5 mm, for example.

Note that FIG. 1 shows an example in which one sensor 6 is arranged at a position diagonally 45° above the edge portion. This is the position when the measurement is performed by projecting the laser light L onto the upper half area of the edge portion, for example. On the other hand, when the laser light L is projected onto the lower half of the edge portion for measurement, the position and angle can be adjusted by the sensor angle adjustment mechanism 7 as indicated by the dashed line in FIG. 1 (position diagonally 45° downward with respect to the edge portion).

Of course, the adjustment position is not limited to these two positions, and can be determined as appropriate. In the above example, the upper and lower halves of the edge portion are described separately, but the ranges (measurement ranges) in the edge portion onto which the laser light L is projected from each position may overlap. If they overlap, they should be synthesized.

The control unit 9 can be connected not only to the arm 8 but also to the rotating means 3, and the rotation speed of the holding portion 2 (and the wafer W) by the rotating means 3 and the adjustment position and adjustment angle of the sensor 6 can be controlled by linking. Further, the sensor 6 is also connected, and the control unit 9 controls the projection of the laser light L and measures the shape of the edge portion of the wafer W from the received diffuse reflected light R by triangulation method can also be done collectively. Through these link control, shape data (measured shape) can be obtained by automatically grasping what kind of measurement data was obtained at which position in the outer peripheral direction (circumferential direction) on the edge portion of the wafer W.

Furthermore, it is possible to create a program in the control unit 9 so that various data are automatically calculated using the shape data obtained by the measurement. By doing so, the control unit 9 can easily obtain various data.

With such a wafer edge portion measuring apparatus 1 of the present invention, the edge portion of the wafer is measured without being influenced by the surface state of the wafer edge portion by using the diffuse reflected light instead of the specular reflected light when performing the shape measurement. That is, it is very significant because the shape of the wafer can be measured even in processes such as slicing process, chamfering process, lapping/grinding process, and etching process. Moreover, the measurement can be performed in a short time with a simpler optical system than the conventional one.

Although the size of the wafer W to be measured is not limited, the larger the size becomes, the higher the effectiveness of the present invention in obtaining the effect of shortening the measurement time becomes as described above.

Examples of various data calculated from the above-described measured shape include the following.

First, by calculating the variation from the average (ideal) edge portion shape in each processing process, it is possible to detect the adhesion of foreign matter or the like. That is, it can be determined from the difference between the measured shape of the edge portion and the ideal shape of the edge portion calculated from the measured shape (for example, its size, area, and volume). Here, as an example of the ideal shape, the average shape of the measured shape (the shape curve obtained by averaging the unevenness of the shape curve of the edge portion obtained by measurement) is taken as an example, but it is not limited to this, and the algorism of calculation for idealization can be determined as appropriate.

In addition, since the shape of the edge portion of the wafer in each processing process can be measured, grinding removal, lapping removal, and etching removal can be measured from the measured shape of the edge portion before and after those processing processes.

Also, from the measured shape of the edge portion in the same processing process obtained in chronological order, it is possible to infer data related to the life of the tools used in the processing process. For example, it is possible to determine, in real time, grinding wheel life in the chamfering process, lapping carrier life in the lapping process, and etchant life in the etching process.

Next, the edge portion measuring method of the present invention using the edge portion measuring apparatus 1 of FIG. 1 will be described.

FIG. 2 is an explanatory diagram showing an example when measuring the shape of the lower half of the edge portion of the wafer (that is, the case of the dashed line in FIG. 1). This is for measuring by adjusting the sensor angle adjustment mechanism 7 so that the laser light L is projected from a position diagonally 45° below the edge portion of the wafer W.

A wafer W to be measured is placed on the holding portion 2 and fixed and held. Further, the sensor angle adjustment mechanism 7 is used to adjust the position and angle of the sensor 6 as shown in FIG. 2.

Then, while projecting the laser light L from the light projecting portion 4 of the sensor 6 toward the lower half of the edge portion of the wafer W, the rotating means 3 rotates the wafer W once (360 degrees). At this time, the diffuse reflected light R generated by the wafer W is also received by the light receiving detection unit 5.

After measuring the entire circumference in this way, the sensor angle adjustment mechanism 7 adjusts the position and angle of the sensor 6, and moves to the position of the sensor indicated by the solid line in FIG. 1 (position diagonally 45° above the edge portion). Then, the wafer W is rotated once (360 degrees) while projecting the laser light L toward the upper half of the edge portion, and the entire circumference is measured.

The measurement position of the edge portion of the wafer W is determined by detecting orientation flat or notch provided on the circumference of the wafer W by the light receiving detection unit 5, and the rotation speed of the rotating means 3 and the adjustment position and adjustment angle of the sensor angle adjustment mechanism 7 are linked to determine which coordinate on the circumference of the wafer W.

Here, an example of measuring from the lower surface BS side to the upper surface TS side (from the lower half to the upper half of the edge portion) is shown, but conversely, it may be measured from the upper surface TS side to the lower surface BS side (from the upper half to the lower half of the edge portion).

An example of measurement by the triangulation method will now be described with reference to FIG. 3. It shows the positional relationship between the measurement point (the edge portion of the wafer W) and the sensor 6 in plan view.

First, a measurement point on the edge portion of the wafer W is defined as a measurement point P1 (reference measurement point). Laser light is projected from the light projecting portion 4 of the sensor 6 toward the P1 and the imaging position at light receiving detection unit 5 of the diffuse reflected light is set to Q1 (reference imaging position). More specifically, the light receiving detection unit 5 can be provided with a light receiving lens E and a light receiving element F, and the diffuse reflected light is condensed by the light receiving lens E and formed into an image on the light receiving element F.

Then, when the distance to the measurement point changes, the angle of the diffuse reflected light that is collected changes, and the imaging position on the light receiving element F changes accordingly.

For example, as shown in FIG. 3, in case of a convex portion (measurement point P2), it is closer to the sensor 6 than the reference measurement point (measurement point P1), and the imaging position becomes Q2. On the other hand, when measuring a concave portion (measurement point P3), it is far from the sensor 6 with respect to the reference measurement point (measurement point P1) and the imaging position becomes Q3.

Since the change in the imaging position is proportional to the amount of movement of the measurement point with respect to the sensor 6, the amount of change in the imaging position can be read and measured as the amount of movement of the measurement point.

When measuring the entire circumference of the edge portion, from the transition in the amount of change in imaging position (transition in the amount of movement of the measurement point), the unevenness with respect to the reference measurement point at each position on the entire circumference can be known. The surface shape of the edge portion of the wafer W can be measured.

The method of determining the above reference measurement points is not particularly limited. As described above, it is also possible to use a certain measurement point in the edge portion.

Alternatively, once the entire circumference of the edge portion is measured, the average value of the measured values (transition of the amount of change in the imaging position (movement amount of the measurement point)) is calculated for the entire circumference, and the average value is taken as the reference measurement point (in short, it corresponds to the ideal shape of the edge portion described above).

In addition, when the size of the protrusion or defect is large (when the amount of change is extremely large in a part), the above average value is greatly affected. Therefore, if the data (measured values) of such locations are included in the calculation of the average value (reference measurement point), there is a possibility that normal locations may be erroneously determined as abnormal locations such as irregularities. Therefore, it is conceivable to rearrange the data for calculating the average value in ascending order, extract only the data close to the central value, and use it for calculating the average value. For example, an interquartile range can be used. Of course, the division is not limited to 4 divisions, and data in the 4th and 5th ranges of 8 divisions may be used. By doing so, it becomes possible to reduce the influence of the large protrusions or the like on the average value, the average value (reference measurement point) can be determined as a more ideal shape, and the accuracy can be improved.

As described above, in the first embodiment, the position and the like of one sensor 6 can be adjusted by the sensor angle adjustment mechanism 7.

Here, the number of sensors 6 is not particularly limited, and may be only one. When plural number of sensors are used, it is also possible to divide it into measurement areas and perform measurement simultaneously by them (In other words, the entire area on the edge portion is divided into plural measurement areas, and each sensor is responsible for each of the plural measurement areas). In this case, the measurement can be performed in a shorter time than in the case of measuring the entire area with only one, which is preferable.

A second embodiment in which a plurality of sensors 6 is fixedly arranged will be described below.

Second Embodiment: Embodiment in which the Sensors are Fixedly Arranged

FIG. 4 shows an example of an edge portion measuring apparatus according to a second embodiment of the present invention.

As shown in FIG. 4, for example, two sensors 6 are fixedly arranged to measure the upper half and the lower half of the edge portion of the wafer W in share (positions diagonally 45° above and diagonally 45° below the edge portion). It is also possible to shorten the measurement time by half by measuring by using them simultaneously. Moreover, it is convenient because it is a fixed arrangement.

Of course, the number is not limited to two, and it is also possible to divide the entire area of the edge portion into three or more and use three or more fixedly arranged sensors 6 to enable simultaneous measurement.

Third Embodiment

FIG. 5 shows an example of an edge portion measuring apparatus according to a third embodiment of the present invention.

As shown in FIG. 5, two sensors for measuring the notch portion of the wafer W are further fixedly arranged (two on the left side) in the edge portion measuring apparatus of the second embodiment. One is positioned vertically above the wafer W for measurement of the top half of the notch inner surface and the other is positioned vertically below the wafer W for measurement of the bottom half of the notch inner surface. When the wafer W rotates, the laser light L can be projected toward a position through which the notch portion passes. This makes it possible to measure the shape of the notch inner surface at the same time.

Fourth Embodiment

As an example of the sensor 6, a line sensor is particularly cited, and an example of measuring a wide range of the upper half (or lower half) of the edge portion of the wafer W at one time has been described, but the present invention is of course not limited to this. An apparatus equipped with a sensor with a narrower projected-light range (less number of laser light) or a sensor that emits a single laser light, such as a laser pointer, can also be used to divide the same measurement range into multiple measurement areas and measure.

FIG. 8 shows an example of an edge portion measuring apparatus according to a fourth embodiment of the present invention, which is equipped with a sensor for projecting a single laser light.

Although a plurality of sensors 6 may be fixedly arranged, for example, one sensor may be prepared for measuring the upper half of the edge portion of the wafer W, and light may be emitted and received while the position is adjusted by the sensor angle adjustment mechanism. Specifically, the sensor 6 is arranged diagonally 45° above the edge portion (that is, the laser light L is projected diagonally 45° downward). The position of the sensor 6 can be adjusted by sliding the sensor 6 along the direction (the X-axis direction in FIG. 8) orthogonal to the light projection direction by the sensor angle adjustment mechanism (arm 8). With such an apparatus, by adjusting the sliding interval in the X-axis direction, it is possible to perform light projection and light reception by sliding at an extremely short interval, and more detailed shape measurement becomes possible.

When measuring, first, a laser light L is emitted from the light projecting portion 4 of the sensor 6 (the position indicated by the solid line in FIG. 8) toward the edge of the range to be measured (for example, the position C2 or the boundary B2 in FIG. 6). While projecting light, the rotating means 3 rotates the wafer W once (360 degrees). At this time, the diffuse reflected light R generated by the wafer W is also received by the light receiving detection unit 5. For the sake of simplicity, only the laser light L from the light projecting portion 4 is shown here.

After measuring the entire circumference in this manner, the sensor angle adjustment mechanism 7 slides the sensor 6 outward (to the right in FIG. 8) along the X-axis direction to adjust the position, to the position indicated by the dotted line in FIG. 8. Then, the wafer W is rotated once (360 degrees) while projecting the laser light L toward a location outside the previously measured location, and the entire circumference is measured. By repeating this, the upper half side of the edge portion of the wafer W is measured.

Also, the lower half side can also be measured in the same way using a separately prepared sensor located diagonally 45° below the edge portion.

It should be noted that the present invention is not limited to the above-described first to fourth embodiments, and it is of course possible to adopt a form in which these are appropriately combined.

According to the present invention as described above, the shape of the edge portion of the wafer W can be measured in a short time regardless of the surface state thereof. Examples to obtain further data from the obtained measured shape will be explained below. These can be calculated by the control unit 9, for example.

<Measurement of Machining Removal in Processing Process>

A silicon wafer is prepared by slicing an ingot with a diameter of 300 mm or larger using a wire saw in the slicing process.

A chamfering process of chamfering the edge portion of the wafer W with a grinding wheel, a lapping process of lapping both surfaces of the wafer W with abrasive grains by a lapping machine, and an etching process of etching the surface of the wafer W by immersing it in an alkaline aqueous solution, and the edge portion shape before and after each processing process is measured using the edge portion measuring apparatus of the present invention (such as the edge surface measuring apparatus 1 of the first embodiment).

Then, for example, by comparing the shape of the edge portion of the same wafer measured after the slicing process and the shape of the edge portion after the chamfering process, and obtaining the difference data of these shapes, it is possible to calculate how much the grinding removal is, by the grinding wheel in the chamfering process.

Similarly, it is possible to calculate the lapping removal in the lapping process and the etching removal with an alkaline aqueous solution in the etching process.

In addition, a standard is required for calculating each of these machining removals. For example, in case of the grinding removal in the chamfering process, it can be the step of the wire mark on the wafer after the slicing process. In addition, in the case of lapping or etching in the lapping process or etching process, the diameter can be measured before processing, and the center of the diameter can be used as a reference.

<Determination of the Life of Tools and Chemicals Used In the Processing Process>

A silicon wafer is prepared by slicing an ingot with a diameter of 300 mm or larger using a wire saw in the slicing process.

In the chamfering process, the edge portion of the wafer W is chamfered with a grinding wheel by a chamfering apparatus. Wafers W are continuously chamfered with the grinding wheel of the same chamfering apparatus, and the shape of the edge portion after processing, for example, 1, 500, 1000, 2000 wafers are measured by the edge portion measuring apparatus of the present invention (the edge portion measuring apparatus 1 of the first embodiment, etc.).

Then, the measured shapes of these edge portions are compared. Through these comparisons, it is possible to compare changes in the shape of the edge portion over time as the number of processed pieces increases. Conversely, since the degree of wear and deterioration of the grinding wheel of the chamfering apparatus can be known, the life of the grinding wheel can be checked in real time.

Furthermore, in the lapping process where the carrier used during the lapping process contacts and wears the edge portion of the wafer W, it is possible to check the life of these carriers in real time, and in the etching process, it is possible to check the chemical life of the alkaline aqueous solution in real time.

As a result, it is possible to extend the life of chemicals and tools (each member) to the maximum without causing an abnormality in the shape of the edge portion of the wafer W, thereby it becomes possible significantly to reduce manufacturing costs while maintaining quality.

The present invention is not limited to the above embodiments. The above-described embodiments are just examples, and any examples that substantially have the same configuration and demonstrate the same functions and effects as those in the technical concept disclosed in the claims of the present invention are included in the technical scope of the present invention.

The invention claimed is:

1. An edge portion measuring apparatus for measuring shape of an edge portion of a wafer, comprising:
   a holding portion that holds the wafer;
   a rotating means for rotating the wafer by rotating the holding portion; and
   a sensor which comprises a light projecting portion for projecting a laser light from a light source onto the edge portion of the wafer held by the holding portion, and a light receiving detection unit that receives diffuse reflected light that the laser light projected from the light projecting portion is reflected at the edge portion of the wafer, wherein
   the rotating means is configured to rotate the wafer while the wafer is held by the holding portion, the wafer being in subjected to a slicing process, a chamfering process, a lapping/grinding process, or an etching process,
   the sensor is configured to project the laser light and receive the diffuse reflected light at least in a range from a normal direction of a held surface of the wafer to a normal direction of a surface opposite to the held surface, and
   the edge portion measuring apparatus is configured to measure the shape of an entire area of the edge portion of the wafer by a triangulation method in which an amount of movement of a measurement point with respect to the sensor is measured from an amount of change in an imaging position of the diffuse reflected light received by the sensor.

2. The edge portion measuring apparatus according to claim 1, further comprising a plurality of the sensors.

3. The edge portion measuring apparatus according to claim 1, wherein,
the sensor is of fixed placement, or
the edge portion measuring further comprises a sensor angle adjustment mechanism for adjusting position and angle of the sensor along the edge portion of the wafer, and the sensor angle adjustment mechanism is configured to adjust the position and angle of the sensor.

4. The edge portion measuring apparatus according to claim 2, wherein,
the sensor is of fixed placement, or
the edge portion measuring further comprises a sensor angle adjustment mechanism for adjusting position and angle of the sensor along the edge portion of the wafer, and the sensor angle adjustment mechanism is configured to adjust the position and angle of the sensor.

5. The edge portion measuring apparatus according to claim 1, further comprising:
a control unit that determines foreign matter adherence, chipping, chips, or streaks from a difference between measured shape of the wafer edge portion and ideal shape of the wafer edge portion calculated from the measured shape.

6. The edge portion measuring apparatus according to claim 2, further comprising:
a control unit that determines foreign matter adherence, chipping, chips, or streaks from a difference between measured shape of the wafer edge portion and ideal shape of the wafer edge portion calculated from the measured shape.

7. The edge portion measuring apparatus according to claim 3, further comprising:
a control unit that determines foreign matter adherence, chipping, chips, or streaks from a difference between measured shape of the wafer edge portion and ideal shape of the wafer edge portion calculated from the measured shape.

8. The edge portion measuring apparatus according to claim 4, further comprising:
a control unit that determines foreign matter adherence, chipping, chips, or streaks from a difference between measured shape of the wafer edge portion and ideal shape of the wafer edge portion calculated from the measured shape.

9. A method for measuring an edge portion for measuring shape of the edge portion of a wafer, comprising:
holding the wafer with a holding portion;
projecting a laser light from a light source in a sensor onto the edge portion of the wafer held by the holding portion, and receiving, with the sensor, diffuse reflected light that is the laser light projected from the light source and that is reflected at the edge portion of the wafer;
rotating the wafer by rotating the holding portion, the wafer being subjected to a slicing process, a chamfering process, a lapping/grinding process, or an etching process;
receiving the diffuse reflected light by the sensor at least in a range from normal direction of a held surface of the wafer to normal direction of a surface opposite to the held surface; and
measuring the shape of an entire area of the edge portion of the wafer by a triangulation method in which an amount of movement of a measurement point with respect to the sensor is measured from an amount of change in an imaging position of the diffuse reflected light received by the sensor.

10. The method for measuring an edge portion according to claim 9, further comprising using a plurality of the sensors.

11. The method for measuring an edge portion according to claim 9, further comprising:
using a fixed arrangement as the sensor, or
using a sensor angle adjustment mechanism that adjusts position and angle of the sensor along the edge portion of the wafer, and using the sensor angle adjustment mechanism that can adjust the position and angle of the sensor.

12. The method for measuring an edge portion according to claim 10, further comprising:
using a fixed arrangement as the sensor, or
using a sensor angle adjustment mechanism that adjusts position and angle of the sensor along the edge portion of the wafer, and using the sensor angle adjustment mechanism that can adjust the position and angle of the sensor.

13. The method for measuring an edge portion according to claim 9, further comprising:
using a control unit to determine foreign matter adherence, chipping, chips, or streaks from a difference between measured shape of the edge portion of the wafer and ideal shape of the edge portion of the wafer calculated from the measured shape.

14. The method for measuring an edge portion according to claim 10, further comprising:
using a control unit to determine foreign matter adherence, chipping, chips, or streaks from a difference between measured shape of the edge portion of the wafer and ideal shape of the edge portion of the wafer calculated from the measured shape.

15. The method for measuring an edge portion according to claim 11, further comprising:
using a control unit to determine foreign matter adherence, chipping, chips, or streaks from a difference between measured shape of the edge portion of the wafer and ideal shape of the edge portion of the wafer calculated from the measured shape.

16. The method for measuring an edge portion according to claim 12, further comprising:
using a control unit to determine foreign matter adherence, chipping, chips, or streaks from a difference between measured shape of the edge portion of the wafer and ideal shape of the edge portion of the wafer calculated from the measured shape.

* * * * *